United States Patent [19]

Kobayashi et al.

[11] Patent Number: 5,133,430
[45] Date of Patent: Jul. 28, 1992

[54] DRUM BRAKE

[75] Inventors: Kinzo Kobayashi, Kanagawa; Harumi Ohshima, Yamanashi; Shinichi Izumi, Tokyo, all of Japan

[73] Assignee: Tokico Ltd., Kanagawa, Japan

[21] Appl. No.: 661,533

[22] Filed: Feb. 27, 1991

[30] Foreign Application Priority Data

Feb. 27, 1990 [JP] Japan .............................. 2-19414[U]

[51] Int. Cl.$^5$ .............................................. F16D 51/00
[52] U.S. Cl. .................................. 188/326; 188/325; 188/78
[58] Field of Search ................... 188/326, 325, 78, 64, 188/4 B, 71.1, 71.5, 72.1, 73.47

[56] References Cited

U.S. PATENT DOCUMENTS 3,162,273  5/1960  Burnett .............................. 188/326
4,344,512  8/1982  Woo .................................. 188/326

Primary Examiner—Joseph F. Peters, Jr.
Assistant Examiner—Kenneth Lee
Attorney, Agent, or Firm—Wenderoth, Lind & Ponack

[57] ABSTRACT

A drum brake includes a pair of brake shoes which are provided such that when expanded, they are forced against a brake drum to generate a braking force, a strut which is received in notches formed in the respective webs of the brake shoes so as to extend therebetween, a parking lever which is rotatably supported on either one of the brake shoes such that when rotated, it engages the strut to expand the brake shoes, and a coil spring which is loaded between the strut and the notch formed in the web of the other brake shoe to bias the strut toward the first brake shoe. The notch in the web that is engaged with the strut includes a first notch portion that is formed by cutting the outer peripheral portion of the web and a second notch portion that is formed by further cutting the web at the bottom of the first notch portion at the approximately central portion thereof in the direction of the width of the notch. The strut is engaged with a surface of the web defining the bottom of the second notch portion and one end of the coil spring is engaged with another surface of the web defining the bottom of the first notch portion. Accordingly, the coil spring will not contact the edges of the web due to backlash of the strut, so that the coil spring is prevented from being broken.

1 Claim, 2 Drawing Sheets

DRUM BRAKE

BACKGROUND OF THE INVENTION

1. Field of the Invention

The present invention relates to a drum brake that is attached to a vehicle, for example, an automobile.

2. Description of the Prior Art

One type of known drum brake is designed not only to serve as an ordinary brake that brakes a running vehicle but also to function as a parking brake.

One example of this type of drum brake comprises a pair of brake shoes which are provided such that when expanded, they are forced against a brake drum to generate a braking force, a strut which extends into notches formed in the respective webs of the brake shoes so as to extend therebetween, a parking lever which is pivotally supported on either one of the brake shoes such that when rotated, it engages the strut to expand the brake shoes, and a coil spring which is loaded between the strut and the notch formed in the web of the other brake shoe to bias the strut toward the first brake shoe.

In this drum brake, when the parking lever is pivoted, it causes the strut to press the second brake shoe against the brake drum, and the counterforce resulting from this action causes the first brake shoe to be pressed against the brake drum, thereby functioning as a parking brake. The coil spring, which biases the strut in one direction, prevents a backlash in the longitudinal direction of the strut when subjected to vibration.

The above-described prior art suffers, however, from the problems stated below.

Although the coil spring can prevent longitudinal backlash of the strut by biasing it toward the first brake shoe, it cannot prevent backlash of the strut in a direction which intersects the longitudinal direction. For this reason, if the strut moves in the notch formed in the web due to backlash, the coil spring, which is interposed between the strut and the web, is damaged by the edges of the web defining the notch (i.e., the corners where the obverse or reverse surface of the web intersects the inner peripheral surface of the web defining the notch, which are denoted by A in FIG. 3), thus causing rusting of the coil spring and a lowering of the biasing force. In the worst case, the coil spring is broken.

SUMMARY OF THE INVENTION

In view of the above-described problems of the prior art, it is an object of the present invention to provide a drum brake which is designed to prevent the coil spring, which is interposed between the strut and the web, from breaking.

To this end, the present invention provides a drum brake comprising: a pair of brake shoes which are expandably provided on a backing plate attached to a nonrotating part of a vehicle such that when expanded, the brake shoes are forced against a brakedrum, each brake shoe having a lining bonded to the outer peripheral surface thereof and a web extending within a plane which is substantially perpendicular to the outer peripheral surface; notches which are formed in the respective webs of the pair of brake shoes in opposing relation to each other; a strut having a central portion and fitting portions which extend from both ends of the central portion, the fitting portions being engaged with the webs in the notches thereof such that the strut extends between the pair of brake shoes; a parking lever which is rotatably attached to one of the brake shoes such that when rotated in one direction, the parking lever engages the strut to expand the brake shoes away from each other; a coil spring which is provided between the strut and the web of the other brake shoe to bias the strut toward the first brake shoe; the notch formed in the web of the second brake shoe having a first notch portion that is formed by cutting the outer peripheral portion of the web and a second notch portion that is formed by further cutting the web at the bottom of the first notch portion at the approximately central portion thereof in the direction of the width of the notch; and the coil spring surrounding one of the fitting portions of the strut, one end of the coil spring being disposed on a surface defining the bottom of the first notch portion, the end of the above-mentioned fitting portion being engaged with the surface defining the bottom of the second notch portion.

By virtue of the above-described arrangement, even if the strut moves in a direction intersecting the longitudinal direction thereof due to a backlash in this direction, since the end portion of the strut is in engagement with the web at the bottom of the second notch portion and will not contact the coil spring that is in engagement with the web at the bottom of the first notch portion, there is no possibility that the coil spring will be bumped against the corners of the web by the strut, and thus the coil spring is prevented from being broken.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like members, and of which.

DETAILED DESCRIPTION OF THE PREFERRED EMBODIMENTS

One embodiment of the present invention will be described below with reference to the accompanying drawings. It should be noted that in this embodiment the present invention is applied to a drum-in-disk type duo-servo parking drum brake.

A back plate 1 is secured to a nonrotating part (not shown) of a vehicle. A pair of first and second brake shoes are expandably attached to the back plate 1. Linings 4 and 5 are bonded to the respective outer peripheral surfaces of the brake shoes 2 and 3, and webs 2a and 3a project from the respective inner sides of the linings 4 and 5. A brake drum (not shown) is disposed around the pair of brake shoes 2 and 3 with a predetermined gap therebetween. The brake drum is secured to a rotating part of the vehicle.

Figure 1:
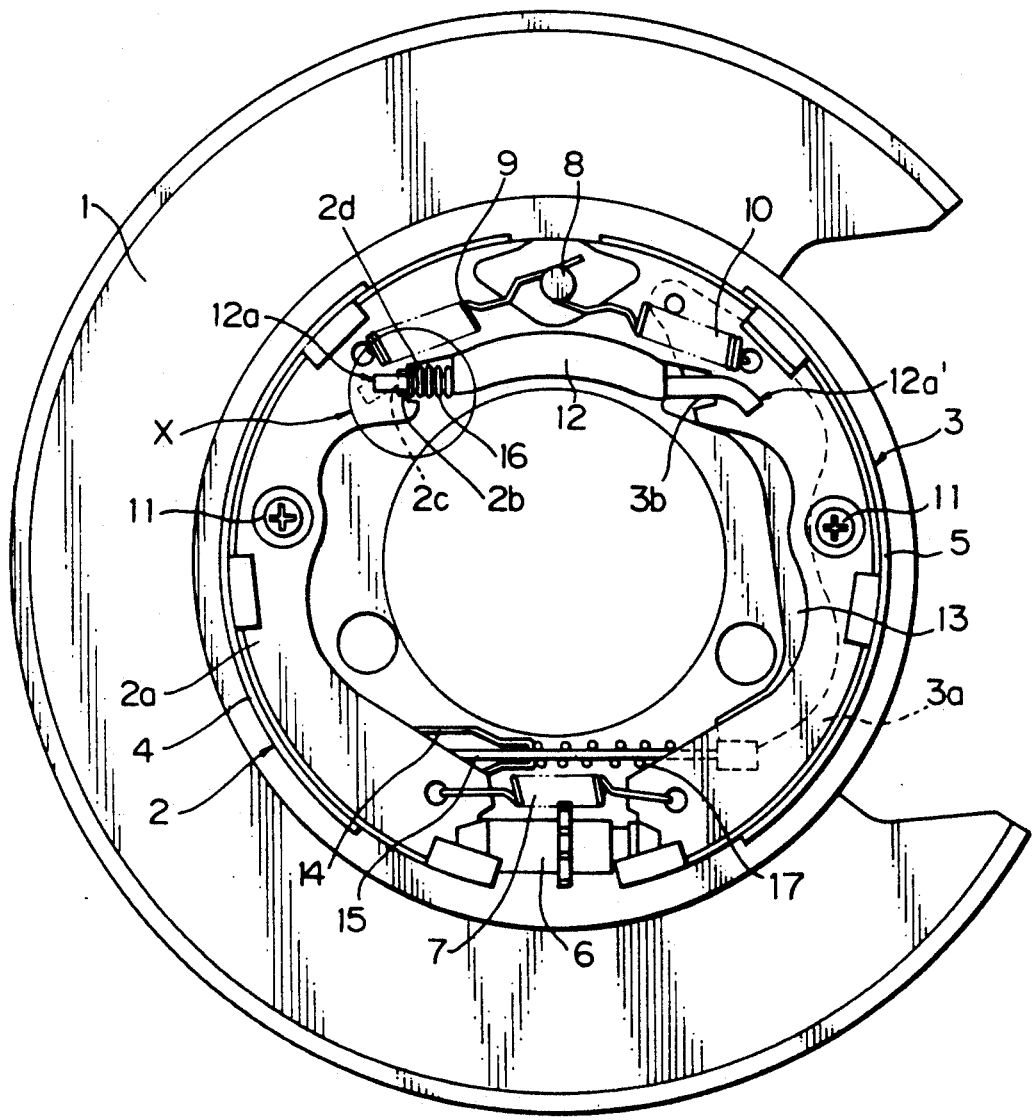
FIG. 1 is a front view of one embodiment of the drum brake according to the present invention.

One end, that is, a first end (i.e., the lower end as viewed in FIG. 1), of each of the brake shoes 2 and 3 abuts against the corresponding end of an adjuster 6 and is resiliently pressed against the adjuster 6 by a spring 7. The other ends, that is, second ends, of the brake shoes 2 and 3 are biased toward each other by respective springs 9 and 10 that are interposed between the associated brake shoes and an anchor pin 8. In addition, each of the brake shoes 2 and 3 is biased toward the back plate 1 by a shoe hold spring (not shown) that is engaged with a shoe hold pin 11 extending upright on the back plate 1.

Notches 2b and 3b are formed in the respective second end portions of the webs 2a and 3a of the brake shoes 2 and 3. A strut 12 extends between the brake shoes 2 and 3, with recesses 12a and 12a' formed at both its ends being engaged with the brake shoes within the notches 2b and 3b. One end of a parking lever 13 is pivotably attached to the second end portion of the second brake shoe 3, and the other end of the parking lever 13 is connected to a parking brake lever (not shown) provided in the passenger compartment through a cable 15 that is guided by a guide member 14. Between the parking lever 13 and the guide member 14, a coil spring 17 is loaded around the cable 15 to bias the parking lever 13 toward its original position.

With this arrangement, when the parking brake lever is pulled, the parking lever 13 is rotated through the cable 15, causing the strut 12 to force the first brake shoe 2 against the brake drum, and the counterforce resulting from this action causes the second brake shoe 3 to be pressed against the brake drum. Thus, the device functions as a parking brake.

Figure 2:
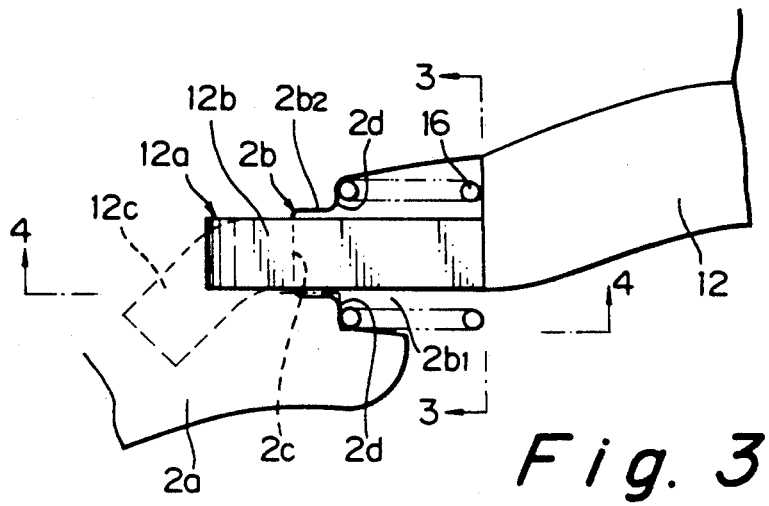
FIG. 2 is an enlarged view of the part X in FIG. 1.
Figure 3:
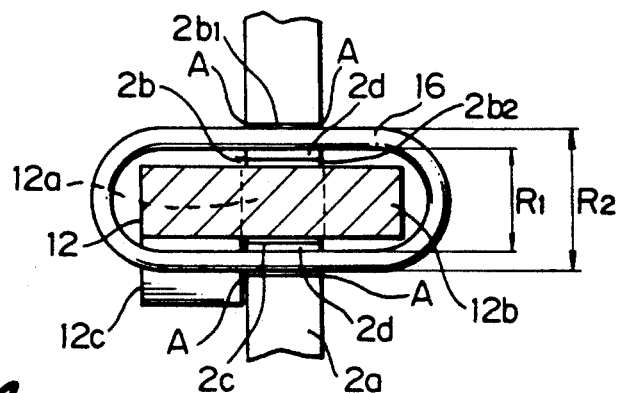
FIG. 3 is a sectional view taken along the line 3—3 in FIG. 2.
Figure 4:
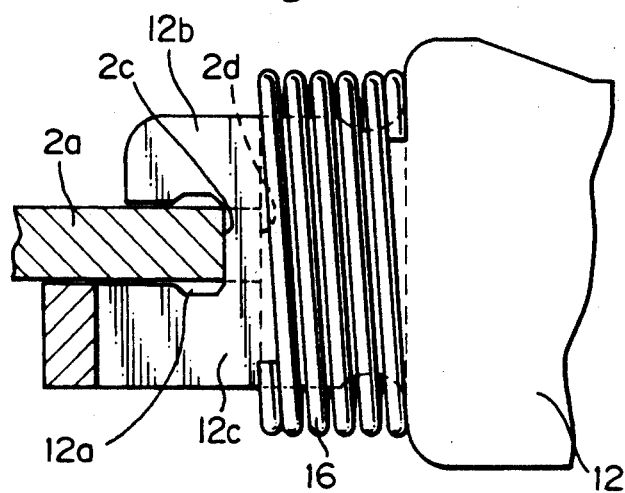
FIG. 4 is a sectional view taken along the line 4—4 in FIG. 2.

Next, an essential part of the present invention will be explained in detail with reference to FIGS. 2 to 4.

One recess 12a, which is formed in the strut 12, is defined by two prongs 12b and 12c. The distal end portion of one prong 12c is bent, as shown in FIGS. 2 and 3. The strut 12 and the web 2a of the first brake shoe 2 engage each other at the recess 12a and the notch 2b. In addition, a coil spring 16 is interposed between the notch 2b and the strut 12 in such a manner as to surround the prongs 12b and 12c, as illustrated, thereby biasing the strut 12 toward the second brake shoe 3.

The notch 2b, which is formed in the web 2a, comprises a first notch portion $2b_1$ having a relatively large width, and a second notch portion $2b_2$ having a relatively small width and extending from the approximately central portion of the bottom of the first notch portion $2b_1$, so that a step portion 2d is defined by the first and second notch portions $2b_1$ and $2b_2$. As is shown best in FIG. 3, the coil spring 16 is wound in the form of an ellipse, which has a major axis extending in the direction of the width of the prongs 12b and 12c of the strut 12 and a minor axis extending in the direction of the thickness thereof. The width of the surface 2c defining the bottom of the notch 2b is set to be slightly larger than the thickness of the prongs 12b and 12c of the strut 12 and smaller than the inner diameter (internal dimension) $R_1$ of the minor axis portion of the coil spring 16. The width of the step portion 2d is set to be slightly larger than the outer diameter (external dimension) $R_2$ of the minor axis portion of the coil spring 16. The surface of the strut 12 defining the bottom of recess 12a is engaged with the surface 2c, and one end of the coil spring 16 is engaged with the step portion 2d.

The operation of the embodiment having the above-described arrangement will next be explained.

Because the strut 12 is biased toward the second brake shoe 3 by the coil spring 16, when the strut 12 is subjected to vibration, backlash in the longitudinal direction of the strut 12 is prevented. Even if the strut 12 moves undesirably in a direction intersecting the longitudinal direction due to backlash in this direction, since the strut 12 is in engagement with the surface 2c defining the bottom of the notch 2b and the end portion of the strut 12 will not contact the coil spring 16 that is in engagement with the step portion 2d, there is no possibility that the coil spring 16 will be bumped against the corners A (see FIG. 3) of the web 2a due to a backlash of the strut 12. Thus, the coil spring 16 is prevented from being damaged or broken.

Although in the foregoing embodiment the present invention is applied to a drum-in-disk type duo-servo parking drum brake, it should be noted that the present invention is applicable to any type of drum brake in which a strut is biased toward one brake shoe by means of a coil spring.

As has been described in detail above, the notch in the web that receives the strut comprises a first notch portion that is formed by cutting the outer peripheral portion of the web and a second notch portion that is formed by further cutting the web at the bottom of the first notch portion at the approximately central portion thereof in the direction of the width of the notch. The strut is engaged with the surface of the web defining the bottom of the second notch portion and one end of the coil spring is engaged with the step portion that is defined by the two notch portions. Accordingly, there is no possibility that the coil spring will bump against the edges of the web due to backlash of the strut, thus preventing it from being damaged or broken. Consequently, the life of the coil spring is increased, and thus the reliability of the drum brake is enhanced.

In addition, since the strut is engaged with the surface of the web defining the bottom of the second notch portion of the notch formed in the web, any backlash of the strut can be minimized, so that it is possible to prevent the generation of chattering noise when the vehicle is running on a rough road.

In addition, the present invention can be readily applied to a conventional drum brake simply by changing the configuration of a notch that is formed in a web, without a rise in the production cost.

Although the present invention has been described above through specific terms, it should be noted here that the described embodiment is not necessarily exclusive and that various changes and modifications may be imparted thereto without departing from the scope of the invention which is limited solely by the appended claims.

What is claimed is:

1. A drum brake comprising:
    a backing plate attached to a non-rotating part of a vehicle;
    a pair of brake shoes expandably provided on said backing plate such that, when expanded, said brake shoes are forced against a brake drum, each of said brake shoes having an outer peripheral surface on which a lining is fixedly attached and a web extending from and substantially perpendicular to said outer peripheral surface, the webs of said brake shoes having notches therein, respectively, located in an opposing relation to each other;
    a strut having a central portion and fitting portions extending from said central portion at opposite ends thereof, said strut extending between said brake shoes with one of the fitting portions thereof being received in the notch in one of said brake shoes and the other of the fitting portions thereof received in the notch in the other of said brake shoes;

a parking lever rotatably attached to said one of said brake shoes such that, when rotated in one direction, said parking lever engages with said strut to expand said brake shoes away from each other; and a coil spring provided between said strut and the respective web of said other of said brake shoes, said coil spring biasing said strut toward said one of the brake shoes so as to take up any backlash between the strut and the webs;

the notch in the respective web of the other of said brake shoes having a stepped configuration including a first notch extending from the outer peripheral portion of said respective web, and a second notch extending from the bottom of said first notch at the approximately central portion thereof, said first notch being defined between generally opposing first edges of said respective web and by a first surface of said respective web extending between said first edges, and said second notch being defined between generally opposing second edges of said respective web and by a second surface of said respective web extending between said second edges;

said coil spring surrounding said other of the fitting portions of said strut received in the notch of the respective web of said other of said brake shoes, one end of said spring resting on said first surface at the bottom of the first notch, said coil spring being wound in the form of an ellipse, the minor axis of the ellipse extending in a direction between the first edges of said respective web between which said first notch is defined, the external dimension of said coil spring in the direction of said minor axis being slightly smaller than the width of said first notch as taken between said first edges, the width of said second notch as taken between said second edges being slightly larger than the dimension of said other of the fitting portions as taken in the direction of the width of said second notch, said other of the fitting portions being received in said second notch and engaging said respective web therewithin, and said other of said fitting portions having a bifurcated end defining two prongs, the two prongs extending beyond the bottom of second notch so as to sandwich said respective web therebetween, whereby said two prongs and said second notch cooperate with each other to restrict the movement of the strut in directions intersecting the longitudinal direction of the strut.

* * * * *